United States Patent [19]

Calle et al.

[11] 4,222,589
[45] Sep. 16, 1980

[54] COUPLING MEANS FOR AN INSTALLATION FOR REFRIGERATING CONTAINERS

[75] Inventors: Daniel G. Calle, Montivilliers; Jacques M. G. de Gaufridy de Dortan, Le Havre, both of France

[73] Assignee: Compagnie Generale d'Entertien et de Reparation Coger, Le Havre, France

[21] Appl. No.: 948,313

[22] Filed: Oct. 3, 1978

[30] Foreign Application Priority Data

Apr. 5, 1977 [FR] France .................................. 77 10261

[51] Int. Cl.² ............................................. F16L 55/00
[52] U.S. Cl. .................................... 285/9 R; 220/232; 285/19; 285/97
[58] Field of Search ....................... 285/9 R, 19, 20, 97; 220/232; 277/34.3, 34

[56] References Cited

U.S. PATENT DOCUMENTS

| 1,475,289 | 11/1923 | Diescher | 285/97 X |
| 3,154,326 | 10/1964 | Anding | 285/9 R |
| 3,227,475 | 1/1966 | Sinkinson | 285/9 R |
| 3,473,828 | 10/1969 | Pearson | 285/9 R |
| 3,606,389 | 9/1971 | Munton et al. | 285/9 R |
| 3,640,079 | 2/1972 | Therisien | 285/97 X |
| 4,049,233 | 9/1977 | Brandin | 285/97 X |
| 4,124,046 | 11/1978 | Lundberg | 285/9 R X |

FOREIGN PATENT DOCUMENTS 778997  7/1957  United Kingdom ...................... 285/97

Primary Examiner—Thomas F. Callaghan
Attorney, Agent, or Firm—Gifford, VanOphem, Sheridan & Sprinkle

[57] ABSTRACT

Coupling means for an installation for refrigerating containers and intended to provide a seal for a flow of cold air between a refrigeration system and containers to be refrigerated comprises a double sleeve 22, 24 which forms an annular space housing an inflatable envelope 30. A movable portion 60 is displaceable axially by the envelope 30, while still being guided by the sleeves, so as to be applied by way of a sealing joint 38 against the wall 14 of the container, around an opening 16 in the wall thereof.

7 Claims, 3 Drawing Figures

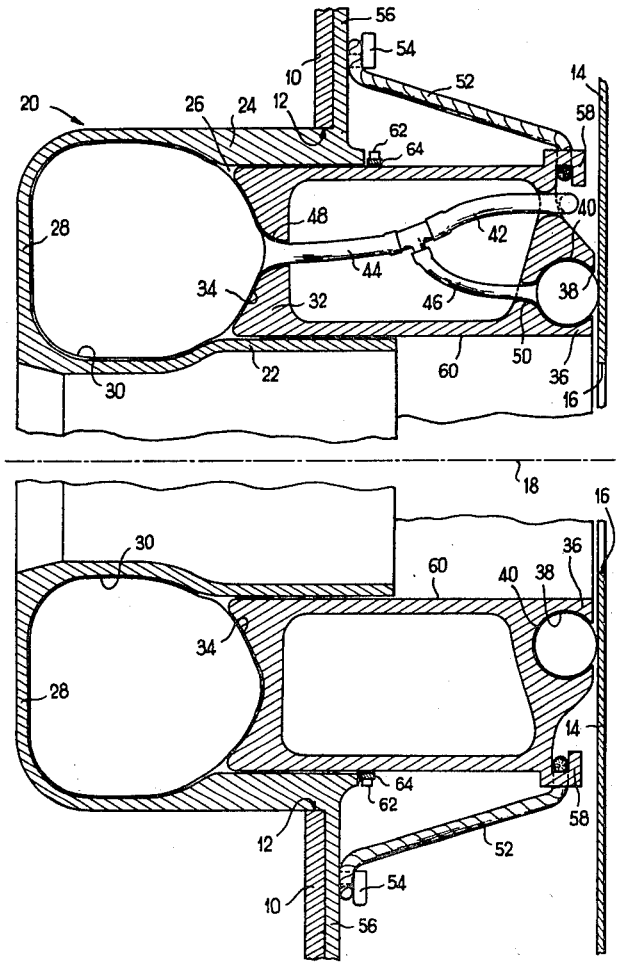

COUPLING MEANS FOR AN INSTALLATION FOR REFRIGERATING CONTAINERS

BACKGROUND OF THE INVENTION

The present invention concerns systems for refrigerating containers (particularly transcontainers) containing perishable goods which must be maintained at a sufficiently low temperature, either during storage or during transportation of the goods, primarily on board ships but also by other means, for example on board refrigerated lorries.

The principle of refrigerating such containers is that their interior is connected to a refrigerating installation which blows for example cold air into the container. A cold air injection opening and a cold air discharge opening are provided in each container and conduits are connected to the containers at such openings, for connection to a refrigeration system which is common to all the containers.

As a single refrigeration system (for example a cold air reservoir) is provided for a plurality of containers, generally, when the containers arrive at their storage location, each of the containers is connected to an opening provided in a cold air circulation duct which has a certain number of openings distributed along its length. It is therefore necessary to provide releasable coupling means for coupling between this system and each container; such means must be easy to use and obviously must ensure a good seal, in order to prevent any leakage of cold air to the exterior of the refrigeration circuit formed by the refrigeration system, the conduits carrying cold air, the container and the coupling means. It is also necessary to provide that such coupling can always be effected with a good sealing action and without difficulty, even if the containers are not always positioned at a precise distance from the common refrigeration system.

SUMMARY OF THE INVENTION

With these various aims in mind, with an installation which is convenient and untroublesome, the present invention proposes a sealing coupling means comprising a first sleeve portion which is fixed with respect to a wall of the refrigeration system and which leaves a cold air flow opening in said wall, and a second sleeve portion which is also fixed with respect to said first wall and which surrounds the first sleeve portion, thus providing an annular space between the two sleeve portions. Said annular space is limited at one end by a transverse wall which connects the two sleeve portions, and an inflatable envelope is housed at the bottom of the annular space which is thus limited by the transverse wall. The coupling means further comprises an annular cylindrical unit which is partially housed in the annular space and is in contact with the inflatable envelope, the cylindrical unit being capable of displacement in the axial direction while being guided by the two sleeve portions, the end of the cylindrical unit at the end remote from the closed end of the annular space also being provided with a sealing means capable of being applied around an opening provided in a container wall disposed facing the opening in the wall of the refrigeration system.

In use, the inflatable envelope is connected to a compressed air supply means which, when set in operation, causes inflation of the envelope, the expansion of which then causes displacement of the cylindrical unit towards the opening in the container which is to be connected to the opening of the refrigeration system.

The interior of the first sleeve portion, which is extended by the internal surface of the cylindrical unit, forms a passage for the cold air which is to circulate between the refrigeration system and the container. A seal is provided on the one hand by the inflatable envelope which is applied under pressure both against the sleeve portions and against the cylindrical unit, and on the other hand by the sealing means which is provided at the end of the cylindrical unit and which is applied, with the pressure transmitted thereto by the inflatable envelope, both against the wall of the container around the opening provided therein and against the cylindrical unit.

The sealing means in question is preferably also an inflatable envelope which is supplied from the same compressed air circuit as the first inflatable envelope.

BRIEF DESCRIPTION OF THE DRAWINGS

The invention will now be described in more detail, by way of example, with reference to the drawings, in which.

DETAILED DESCRIPTION OF THE PREFERRED EMBODIMENT

Figure 1:
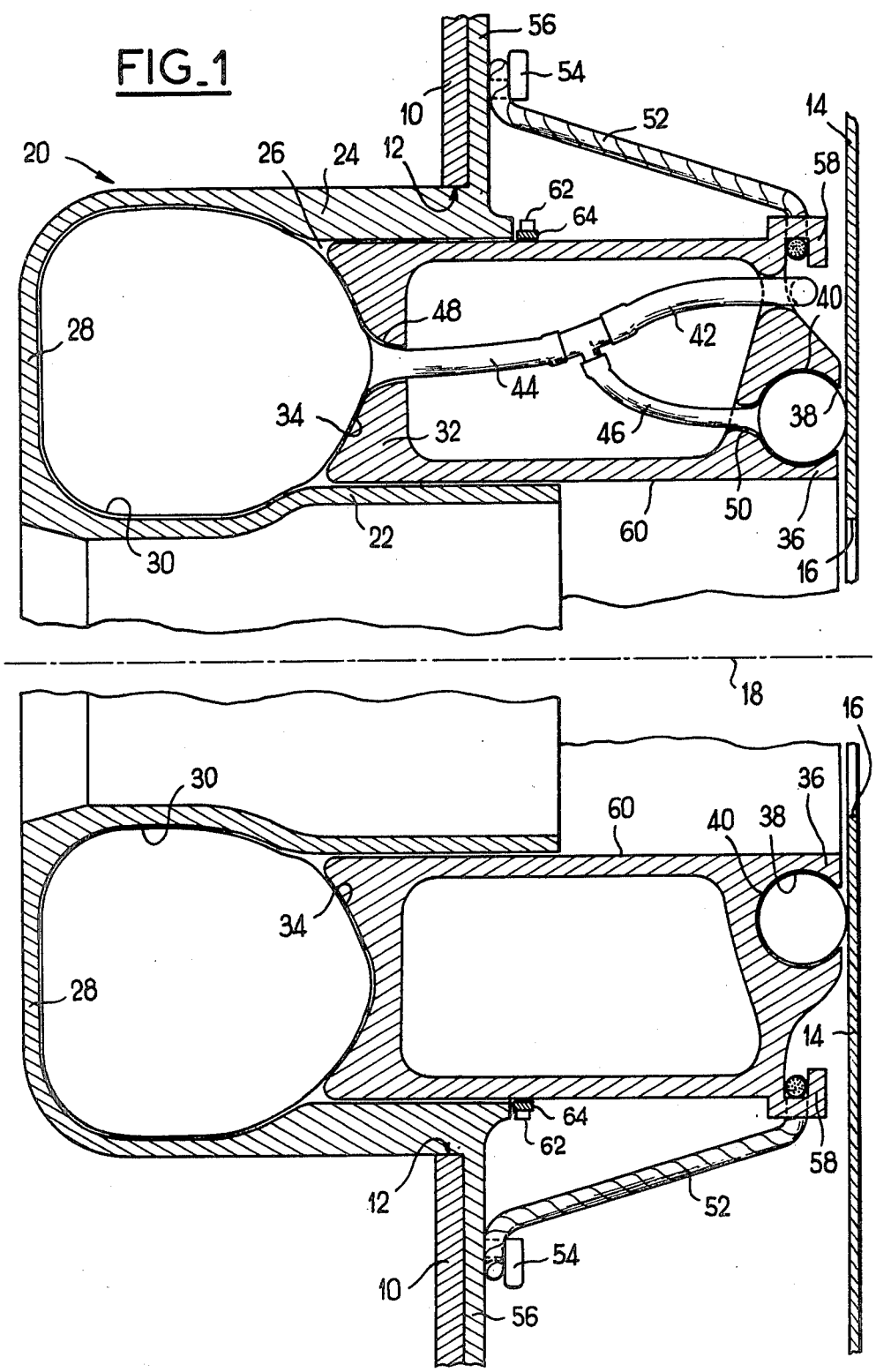
FIG. 1 shows a view in side section of coupling means embodying the invention, shown in a partly extended position.

Referring to FIG. 1, there is shown a first wall 10 which is for example that of a refrigeration system (not shown) disposed on the left-hand part of the wall.

The wall 10 has a circular opening 12 for the flow of cold air from or to the refrigeration system, and it is in the opening 12 that the coupling means embodying the invention is fixed, as will be seen below.

Another wall 14, in this case the wall of a container (or transcontainer) to be refrigerated, is disposed facing the first wall. The wall 14 also has an opening 16 for introducing cold air into or discharging cold air from the interior of the container. The opening 16 is substantially opposite the opening in the first wall, but at a distance which may vary slightly; for example over a range of a few centimeters around a mean distance of about 10 centimeters between the walls 10 and 14.

In order to compensate for such possible variation and to provide an air communication conduit between the openings 12 and 16 which is sealed from the atmosphere outside of the refrigeration system and the container, fixed to the wall 10 is a coupling means 20 of generally cylindrical form, which is centered on the axis 18 of the opening 12 and which is formed in the manner set out below.

The coupling means essentially comprises a first inner cylindrical sleeve portion 22 which is centered on the axis 18 of the opening 12 and whose ends are open in such a way that the sleeve portion defines a conduit portion for the flow of cold air.

The coupling means also comprises another cylindrical sleeve portion 24 which is fixed with respect to the first sleeve portion and which completely surrounds it so as to form a cylindrical annular space 26 between the two sleeve portions over at least a part of the axial length thereof. The annular space 26 is limited at one end by a transverse wall 28 which connects the sleeve portions 22 and 24, fixing them with respect to each other.

The transverse wall 28 therefore forms the bottom of the annular space 26. The transverse wall 28 further serves to confine at one side an inflatable envelope 30 which is also of an annular configuration and which is housed at the bottom of the space 26.

It should be noted that it is not absolutely necessary for the wall 28 to be completely sealingly closed, as its essential purpose is to hold the envelope 30 in place when it is inflated, as well as to secure the two sleeve portions one with respect to the other.

The annular space 26 may be slightly enlarged towards the bottom 28, as shown in the drawings, in order better to hold the inflatable envelope 30 in place.

A cylindrical annular unit 32 whose axis coincides with the axis 18 of the opening 12 and of the sleeves 22 and 24 is housed in the annular space 26. Its radial dimensions are such that it is guided between the outside wall of the sleeve 22 and the inside wall of the sleeve 24. The cylindrical unit is free axially so that it may be displaced, in particular by virtue of inflation of the envelope 30 which is applied against a preferably concave (toric) face 34 of the unit 32.

The length of the annular space 26 and the length of the annular unit 32 are such that the end of the annular unit 32 can project to a greater or lesser extent from the annular space 26, to be applied against the wall 14 of the container to be refrigerated, in spite of a possible lack of precision in positioning of the container, although the unit 32 is still guided by its other end which always remains inside the annular space 26.

The end 36 of the unit 32, which end is outside the annular space 26, is terminated by an annular sealing means which is applied all around the opening 16 in the wall 14 of the container.

The form of sealing means shown in the drawings is another inflatable envelope 38 which is disposed in a toric recess 40 in the end 36 of the unit 32.

The second inflatable envelope 38 may be very well supplied by the same compressed air generator (not shown) which is used for the envelope 30. The drawing shows a common compressed air supply conduit 42 which, coming from the outside of the coupling member, passes into the interior of the cylindrical unit 32 which is internally hollow for this purpose. The conduit 42 is connected to the two envelopes 30 and 38 by conduits or valves 44 and 46 which pass outwardly of the hollow space in the interior of the cylindrical unit, by way of openings 48 and 50, to pass to the envelopes 30 and 38.

Finally, the cylindrical unit 32 is subjected to the action of a resilient return means, which applies a force against the pressure of the inflatable envelope 30, in order to urge the unit 32 into the annular space 26. In this embodiment the return means comprises an elastic cord 52 which is held in place by lugs 54 distributed around a fixed portion which is fixed with respect to the sleeve portions 22 and 24, and in lugs 58 which are distributed all around the end 36 of the unit 32. The above-mentioned fixed portion which is fixed with respect to the sleeve portions is, in this embodiment, a plate 56 which is transverse with respect to the axis of the sleeve portions and which is welded or bolted to the wall 10 so as to hold the coupling means assembly in place on the wall 10.

In operation, when a container is set in place opposite the refrigeration system, but at a distance which is not necessarily well determined, the envelope 30 is inflated, and possibly also the envelope 38 if there is one. This thrusts the cylindrical unit 32 towards the wall 14 of the container until the sealing means provided at the end of the unit 32 are applied all around the opening 16, under a pressure which is essentially determined by the inflation of the envelope 30 (in fact, such pressure is slightly reduced by the return tension of the elastic cord 52).

The envelope is therefore inflated to a higher or lower pressure, depending on the quality of the seal to be made.

Once the envelope or envelopes has or have been inflated, the sleeve portion 22, extended by the annular inner wall 60 of the unit 32, forms a conduit which communicates the interior of the refrigeration system with the interior of the container. The refrigeration circuit assembly is sealed by the sealing means 38 which is pressed against the wall 14 and the unit 32, and by the inflatable envelope 30 which is also pressed both against the sleeve portions 22 and 24, and against the unit 32.

Figure 2:
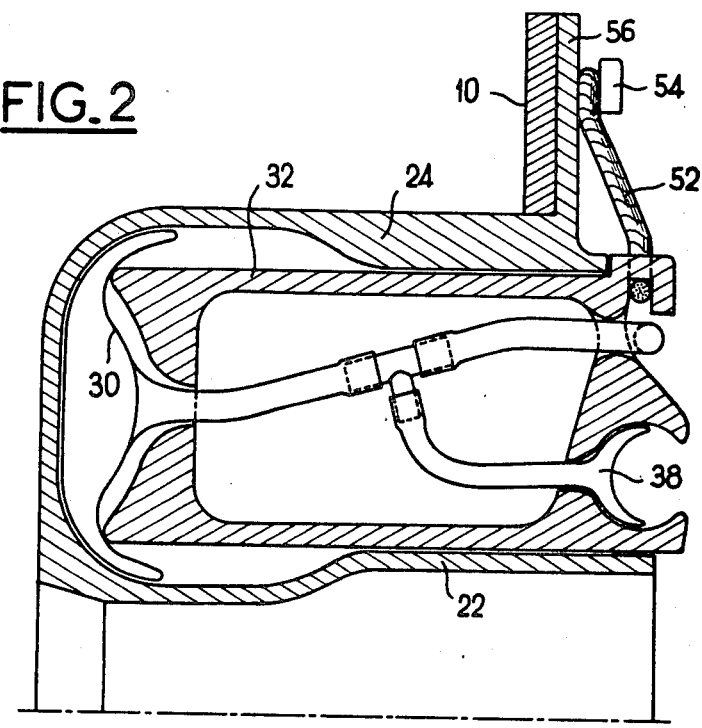
FIG. 2 shows a side sectional view of half of the coupling means, in the retracted position.
Figure 3:
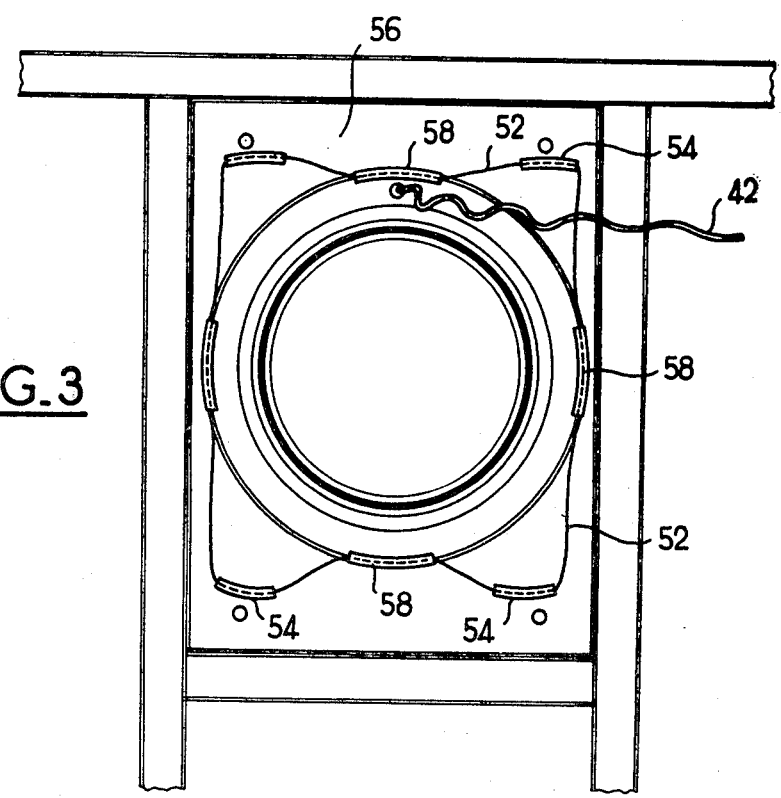
FIG. 3 shows a front view of the coupling means on a reduced scale.

FIG. 2 shows a view similar to that shown in FIG 1, in half-section, but showing the unit 32 in its retracted position to which it is moved by the elastic return cord 52 when the envelope 30 is deflated.

Th system illustrated has the substantial advantage of providing precise guiding and precise positioning of the sealing ring 38 around the opening 16 in the wall of the container, without displacement during inflation of the envelope 30.

The coupling means can conveniently be made of glass fibre or polyvinylchloride or moulded epoxy resin.

Shutter means for closing off the openings provided in the walls (in particular the wall of the refrigeration system) are generally provided, operation of such shutter means being synchronised with inflation of the envelopes.

By virtue of the different hollow annular portions provided on the one hand between the sleeve portions 22 and 24 and on the other hand within the cylindrical unit 60, good heat insulation is provided between the cold air circulation conduit leading from the refrigeration system to the container, and the exterior of the system.

A coupling means for given dimensions can be adapted to openings 16 of different diameters, corresponding to different sizes of containers (for example the same coupling means may be used both for so-called 20-foot containers and 40-foot containers).

The amount of space occupied by this coupling system is still very small, being slightly greater than the maximum opening diameter in the container to be refrigerated.

The sealing ring 38 which is applied against the wall 14 of the container to be refrigerated may not be an inflatable envelope, but simply a resilient sealing joint.

In particular in this case it may be desirable to provide a means for maintaining the coupling means in the extended position, in order to preserve the sealing action relative to the exterior, even if the inflatable envelope 30 is no longer supplied with compressed air, for one reason or another.

For example, a clamping ring 62 may be provided around the outside wall of the cylindrical annular unit 32, the clamping ring being applied against said outside wall by way of an annular joint 64. The ring 62, which is released when the coupling means is set in position against the container to be refrigerated, is tightened at the end of the operation of positioning the coupling means, at a position close to the edge of the sleeve portion 24 so as to form an abutment which is fixed with respect to the unit 32, thus to prevent the unit 32 from being retracted into the sleeve portion 24.

It is also possible to provide other means for holding the cylindrical unit 32 in the extended position, in the absence of compressed air in the unit 34, for example bracer members of adjustable length, with a screw-threaded rod, which are interposed between the plate 56 forming the front end of the sleeve 24, and the lug members 58 at the front end of the cylindrical unit 32.

What is claim is:

1. Sealing coupling means, especially intended for sealingly connecting openings provided in walls which are disposed facing each other and which may be at a variable distance from each other, said coupling means comprising:
    a fixed portion which is fixed with respect to one of said walls, said fixed portion comprising:
        a first sleeve portion which leaves an opening in said first wall,
        a second sleeve portion which is fixed with respect to said first wall and which surrounds said first sleeve portion, providing an annular space between said two sleeve portions,
        a transverse wall connecting said two sleeve portions and limiting said annular space at one end thereof, and
        an inflatable envelope disposed at the bottom of said annular space; and
    a movable portion, said movable portion comprising:
        an annular cylindrical unit which is partially housed in said annular space, and which is capable of being axially displaced by said inflatable envelope while being guided by said two sleeve portions, said cylindrical unit having a hollow wall with at least one first axial opening at one axial end communicating with said hollow opening and the exterior of the unit, and at least one second axial opening at the other end communicating with said hollow wall and the exterior of the coupling means, passage means for carrying compressed air connected to said inflatable envelope, said passage means extending through said hollow wall and said axial openings in said cylindrical unit, and
    sealing means provided at the end of said cylindrical unit which is opposite said closed end of said annular space, said sealing means being capable of being applied around the opening provided in said second wall.

2. Coupling means according to claim 1, wherein said sealing means comprises another inflatable envelope housed in a recess provided at the end of said cylindrical unit.

3. Coupling means according to claim 1, including resilient return means between said cylindrical unit and a portion which is fixed with respect to said first wall.

4. Coupling means according to claim 3, wherein the return means comprises an elastic cord which is held both on said portion which is fixed with respect to said first wall, and on said cylindrical unit, by means of lugs or hooks which are provided on said two components.

5. Coupling means according to claim 1, wherein the cylindrical unit is hollow and has in its interior a substantially closed annular space provided with openings for receiving valves for supplying air to the inflatable envelope.

6. Coupling means according to claim 1, wherein said passage means includes a conduit for carrying compressed air connected to said other envelope, said conduit extending through said axial openings provided in said cylindrical unit.

7. Coupling means according to claim 1, including means for locking the coupling means in the extended position.

* * * * *

UNITED STATES PATENT AND TRADEMARK OFFICE
CERTIFICATE OF CORRECTION

PATENT NO. : 4,222,589
DATED : September 16, 1980
INVENTOR(S) : Daniel G. Calle, Jacques M.G. de Gaufridy de Dortan It is certified that error appears in the above-identified patent and that said Letters Patent are hereby corrected as shown below:

Please correct the Assignee shown on the first page of the U.S. Patent as follows:

Delete "d'Entertien" and insert --d'Entretien--.

Signed and Sealed this

Twelfth Day of May 1981

[SEAL]

Attest:

RENE D. TEGTMEYER

Attesting Officer     Acting Commissioner of Patents and Trademarks